US006480255B2

(12) United States Patent
Hoshino et al.

(10) Patent No.: US 6,480,255 B2
(45) Date of Patent: Nov. 12, 2002

(54) SUBSTRATE OF LCD DEVICE HAVING EXTERNAL TERMINALS COVERED WITH PROTECTIVE FILM AND MANUFACTURING METHOD THEREOF

(75) Inventors: Atuyuki Hoshino, Kawasaki (JP); Tadashi Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/886,679

(22) Filed: Jun. 21, 2001

(65) Prior Publication Data
US 2001/0050747 A1 Dec. 13, 2001

Related U.S. Application Data

(63) Continuation of application No. PCT/JP99/07328, filed on Dec. 27, 1999, now abandoned.

(30) Foreign Application Priority Data

Dec. 28, 1998 (JP) .......................................... 10-372788

(51) Int. Cl.[7] ...................... G02F 1/1343; G02F 1/1345
(52) U.S. Cl. ....................... 349/149; 349/139; 349/142; 349/152
(58) Field of Search ................................ 349/149, 139, 349/142, 152

(56) References Cited

U.S. PATENT DOCUMENTS 5,636,329 A * 6/1997 Sukegawa et al. .......... 349/149
5,872,611 A * 2/1999 Hirata et al. ................ 349/147
6,088,072 A * 7/2000 Lee .............................. 349/39

FOREIGN PATENT DOCUMENTS

| JP | 361174512 A | * | 8/1986 |
| JP | 64-38726 | | 2/1989 |
| JP | 04-045580 | | 2/1992 |
| JP | 06-085254 | | 3/1994 |
| JP | 08-184852 | | 7/1996 |
| JP | 08-234225 | | 9/1996 |
| JP | 08-338998 | | 12/1996 |
| JP | 10-020339 | | 1/1998 |
| JP | 10-133216 | | 5/1998 |
| JP | 10-301114 | | 11/1998 |
| JP | 02000113915 A | * | 4/2000 |

* cited by examiner

Primary Examiner—William L. Sikes
Assistant Examiner—Julie Ngo
(74) Attorney, Agent, or Firm—Greer, Burns & Crain, Ltd.

(57) ABSTRACT

An image display area is defined in a main surface of a first substrate, and a terminal area is defined outside the display area. A plurality of first bus lines are arranged on the display area of the main surface of the first substrate. A first insulating layer covers the first bus lines on the main surface of the first substrate. The first bus lines correspond to external terminals on the terminal area of the first substrate, respectively. The external terminals are connected electrically with the corresponding first bus lines, respectively, through first contact holes that pass through the first insulating layer to the upper surface of the first bus lines. The external terminals are covered with a protective insulating layer in such a manner that their ends near the border of the first substrate remain uncovered.

11 Claims, 8 Drawing Sheets

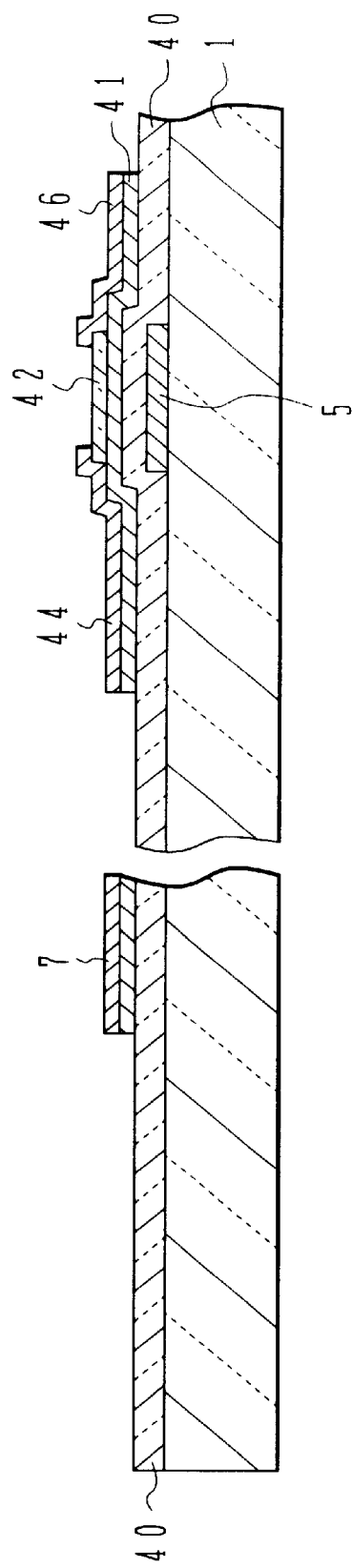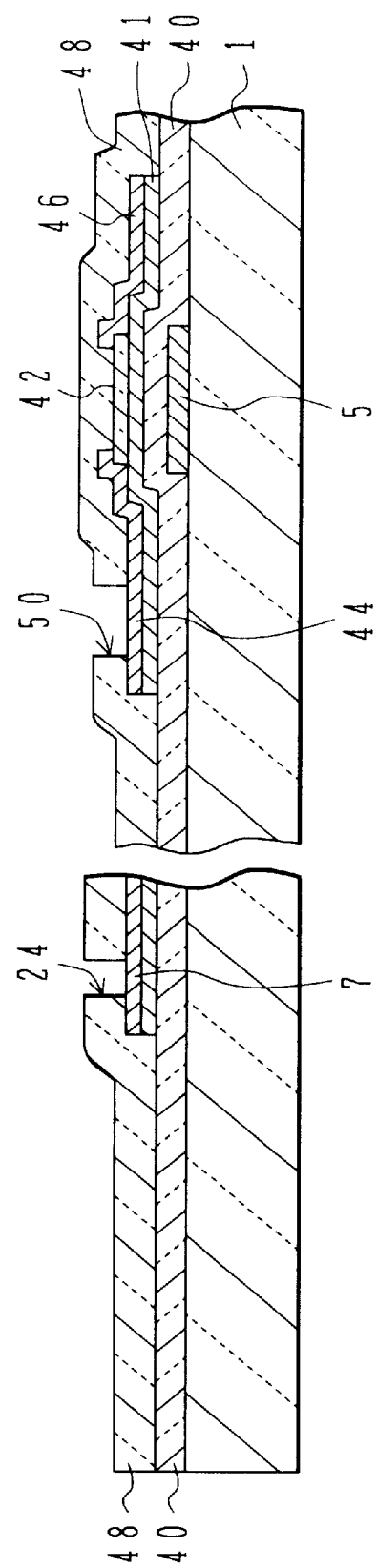

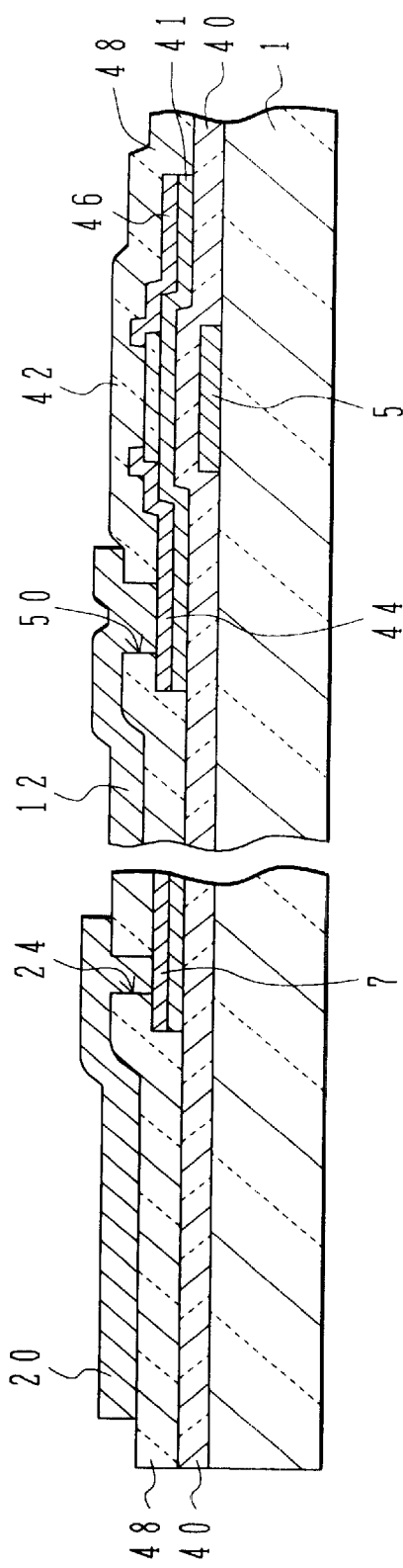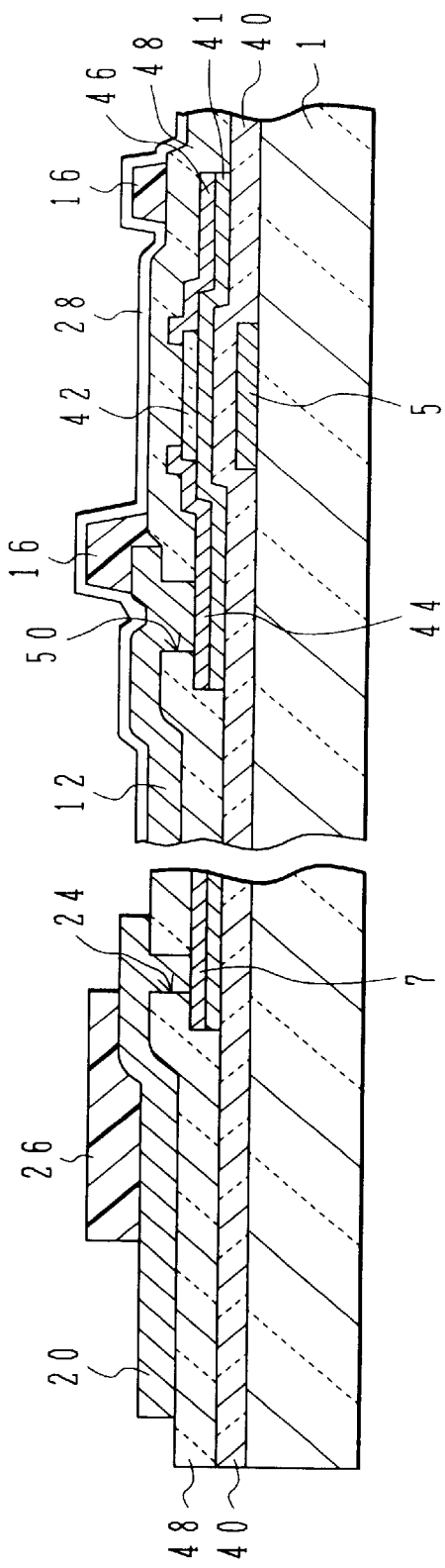

SUBSTRATE OF LCD DEVICE HAVING EXTERNAL TERMINALS COVERED WITH PROTECTIVE FILM AND MANUFACTURING METHOD THEREOF

This is a continuation of International application Ser. No. PCT/JP99/07328, filed Dec. 27, 1999.

TECHNICAL FIELD

The present invention relates to a substrate of an LCD (Liquid Crystal Display) device and a method of manufacture thereof, and more particularly to a substrate of an LCD device having connection terminals to an external circuit disposed near the border of the substrate and to a manufacture method thereof.

BACKGROUND ART

FIG. 6 shows a cross sectional view of a conventional active matrix type liquid crystal display device, showing a connection terminal to an external circuit. A gate insulating film 101 is formed on the surface of a glass substrate 100. The gate insulating film 101 is used as the gate insulating film of a thin film transistor (TFT) of each pixel. A drain bus line 102 is formed on the gate insulating film 101. The drain bus line 102 is connected to a drain terminal of the TFT.

An insulating film 103 is formed on the gate insulating film 101, covering the drain bus line 102. An external terminal 104 is formed in an area near an outer periphery of the insulating film 103. The external terminal 104 is connected to the drain bus line 102 via a contact hole 105 formed through the insulating film 103.

An opposing substrate 110 is disposed spaced by a gap from the glass substrate 100. The opposing substrate 110 is fixed at a position near its peripheral area to the glass substrate 100 with adhesive 115. The upper surface of the external terminal 104 is exposed in a peripheral area of the substrate outside of the adhesive 115. Liquid crystal material 118 is filled in the gap between the glass substrate 100 and opposing substrate 110.

When the opposing substrate 110 is fixed to the glass substrate 100, the border of the opposing surface 110 is aligned approximately with the border of the glass substrate 100, as viewed along a substrate normal direction. After the opposing substrate 110 is fixed to the glass substrate 100, a region 110a near the border of the opposing substrate 110 is cut off so that the external terminal 104 can be connected to an external drive circuit.

While the region 110a near the border of the opposing substrate 110 is cut off, the external terminal 104 may be damaged and disconnected in some cases. A common electrode is formed on the opposing surface of the opposing substrate 110. Conductive dusts may be generated while the region 110a is cut off and may short-circuit the external terminal 104 and common electrode.

DISCLOSURE OF THE INVENTION

It is an object of the present invention to provide a substrate of a liquid crystal display device and a manufacture method thereof, capable of making external terminals hard to be damaged while a region near the border of a substrate opposing another substrate with the external terminals is cut off.

According to one aspect of the present invention, there is provided a substrate of a liquid crystal display device, comprising: a first substrate having an image display area defined on a principal surface of the first substrate and a terminal area defined in a partial area outside of the image display area; a plurality of first bus lines disposed in the image display area on the principal surface of the first substrate; a first insulating film disposed over the principal surface of the first substrate, the first insulating film covering the first bus lines; an external terminal formed in the terminal area of the first substrate for each of the first bus lines, the external terminal being electrically connected to a corresponding one of the first bus lines via a corresponding one of first contact holes formed through the first insulating film and reaching an upper surface of the first bus lines; and a protective film made of insulating material covering a partial upper surface of the external terminal so as not to cover at least an upper surface of the external terminal near an outer peripheral area of the first substrate.

Since a portion of the external terminal is covered with the protective film, it is possible to suppress damages of the external terminal during the processing and working of the later processes. Since a portion of the external terminal in an outer peripheral area is not covered with the protective film, connection between the external terminal and circuit can be established in this portion.

According to another aspect of the present invention, there is provided a method of manufacturing a liquid crystal display device comprising the steps of: preparing a first substrate having an image display area defined on a principal surface of the first substrate and a terminal area defined in a partial area outside of the image display area, the first substrate being formed with: a plurality of first bus lines disposed in the image display area on the principal surface of the first substrate; a first insulating film disposed over the principal surface of the first substrate, the first insulating film covering the first bus lines; an external terminal formed in the terminal area of the first substrate for each of the first bus lines, the external terminal being electrically connected to a corresponding one of the first bus lines via a corresponding one of first contact holes formed through the first insulating film and reaching an upper surface of the first bus lines; a protective film made of insulating material covering a partial upper surface of the external terminal so as not to cover at least an upper surface of the external terminal near an outer peripheral area of the first substrate; a plurality of second bus lines formed in the image display area and crossing the first bus lines; a pixel electrode formed in the image display area and disposed at each cross point between the first and second bus lines; and a switching element for connecting each of the pixel electrodes to a corresponding one of one of the first and second bus lines, a conduction state of the switching element being controlled by a signal applied to a corresponding one of the other of the first and second bus lines; preparing a second substrate formed with a common electrode on a surface thereof; disposing the first and second substrates so that the surface of the second substrate with the common electrode is spaced apart by some distance from the principal surface of the first substrate, and fixing the first and second substrates with a sealing member in such a manner that the sealing member does not cover at least a partial upper surface of the protective film near an outer peripheral area of the first substrate; and cutting a portion of the second substrate near a border of the second substrate so that a new border of the cut second substrate passes an inner area of the protective film as viewed along a direction normal to the first substrate.

Since a portion of the external terminal is covered with the protective film, the external terminal is hard to be damaged while the peripheral portion of the second substrate is cut. It is therefore possible to suppress the generation of conductive defects of the external terminal.

BRIEF DESCRIPTION OF THE DRAWINGS

FIGS. 4A to 4F are cross sectional views of a substrate illustrating a method of manufacturing a TFT substrate of the liquid crystal display device of the first embodiment.

BEST MODE FOR PRACTICING THE INVENTION

Figure 1:
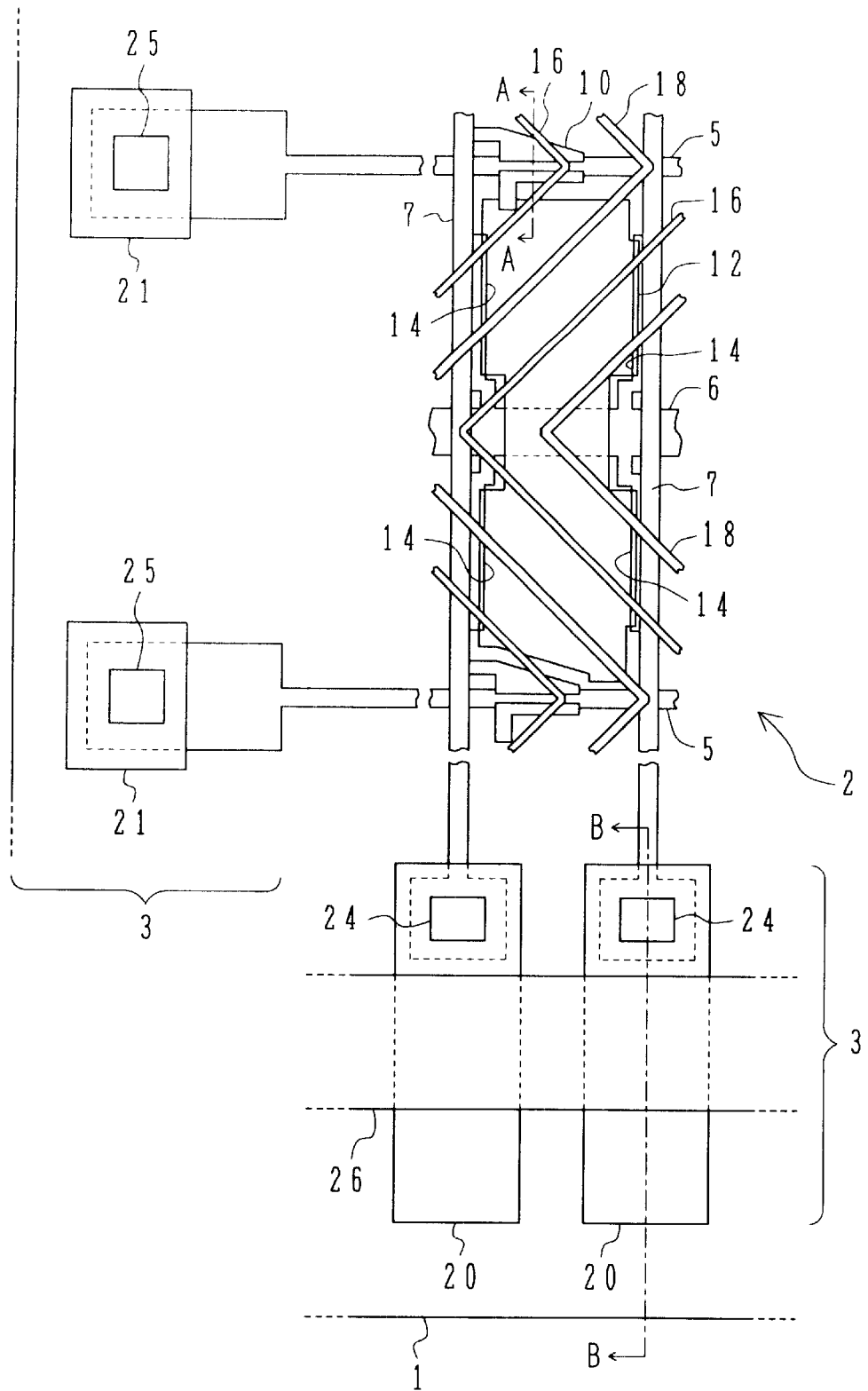
FIG. 1 is a plan view of a substrate with TFT's, and projection patterns on an opposing substrate.

FIG. 1 is a plan view of a substrate with TFT's of a homeotropic type liquid crystal display device, and projection patterns on an opposing substrate, of the first embodiment. An image display area 2 is defined on the surface of a glass substrate 1, and a terminal area 3 is defined outside of the image display area 2. A plurality of gate bus lines 5 extend in the row direction (lateral direction) as viewed in FIG. 1. Between adjacent two gate bus lines 5, a capacitance bun line 6 is disposed extending in the row direction. A gate insulating film covers the gate bus lines 5 and capacitance bun lines 6. On this gate insulating film, a plurality of data bus lines 7 are disposed extending in the column direction (vertical direction) as viewed in FIG. 1.

A thin film transistor (TFT) 10 is formed at each cross point between the gate bus line 5 and data bus line 7. The drain electrode of TFT 10 is connected to a corresponding data bus line 7. The gate bus line 5 also serves as the gate electrode of a corresponding TFT 10.

An interlayer insulating film covers the data bus lines 7 and TFTs 10. A pixel electrode 12 is disposed in an area surrounded by two gate bus lines 5 and two data bus lines 7. The pixel electrode 12 is connected to the source region of a corresponding TFT 10.

An auxiliary capacitor sub-line 14 branched from the capacitance bun line 6 extends along the border of the pixel electrode 12. The capacitance bun line 6 and auxiliary capacitor sub-line 14 form an auxiliary capacitor together with the pixel electrode 12. The potential of the capacitance bun line 6 is fixed.

As the potential of the data bus line 7 changes, the potential of the pixel electrode 12 changes because of capacitive coupling by parasitic capacitance. In the structure shown in FIG. 1, since the pixel electrode 12 is connected via the auxiliary capacitor to the capacitance bus line 6, a potential change of the pixel electrode 12 can be reduced.

On the opposing surfaces of the glass substrate 1 with TFTs and the opposing substrate, first projection patterns 16 and second projection patterns 18 are formed along zigzag patterns extending in the column direction. In order to distinguish the first projection patterns 16 from the second projection patterns 18, the first projection pattern 16 is shown hatched in FIG. 1. The first projection patterns 16 are disposed at an equal interval along the row direction, and their bent points are positioned on the gate bus lines 5 and capacitance bun lines 6. Each second projection pattern 18 has approximately a similar pattern to that of the first projection pattern 16 and is disposed generally at the middle between adjacent two first projection patterns 16.

Data terminals 20 are disposed in a terminal area 3 lower in FIG. 1 in correspondence with data bus lines 7, and in a terminal area 3 left in FIG. 1, gate terminals 21 are disposed in correspondence with gate bus lines 5. Each data terminal 20 is connected to a corresponding data bus line 7 via a contact hole 24. Each gate terminal 21 is connected to a corresponding gate bus line 5 via a contact hole 25. The gate bus line 5 and data bus line 7 are connected to external drive circuits via the gate terminal 21 and data terminal 20, respectively.

A protective film 26 is disposed traversing generally a central area of the data terminal 20 along the row direction. The protective film 26 does not cover the upper surface of the data terminal 20 in an outer peripheral area near the border of the glass substrate 1.

Figure 2A:
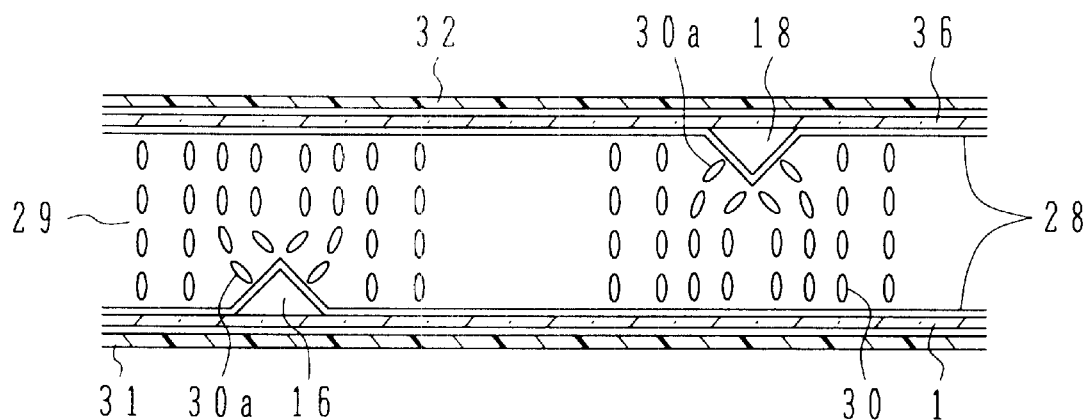
FIGS. 2A and 2B are cross sectional views of a liquid crystal display illustrating the effects of projection patterns.
Figure 2B:
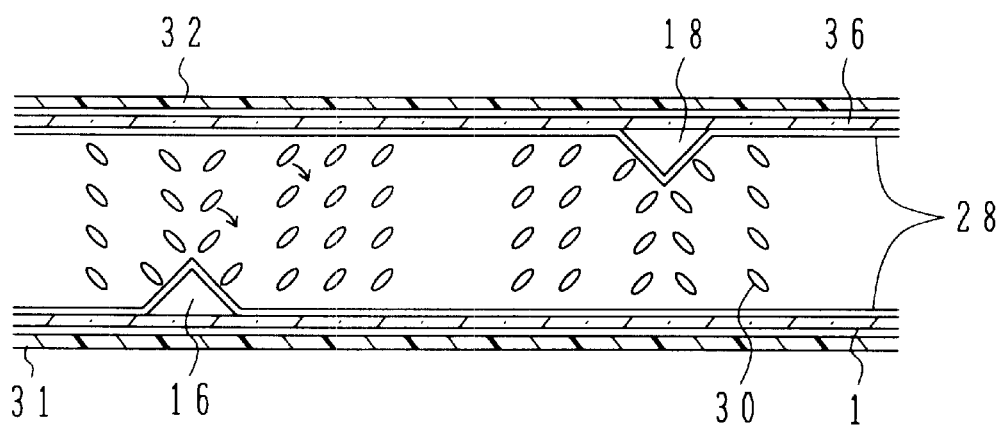

With reference to FIGS. 2A and 2B, the function of the first and second projection patterns 16 and 18 will be described.

FIG. 2A is a cross sectional view of a liquid crystal display device when a voltage is not applied. On the opposing surface of the glass substrate 1, first projection patterns 16 are formed, and on the opposing surface of the opposing substrate 36, second projection patterns 18 are formed. A vertical alignment film 28 is formed on the opposing surfaces of the glass substrate 1 with TFTs and the opposing substrate 36, covering the projection patterns 16 and 18. Between the glass substrate 1 with TFTs and the opposing substrate 36, liquid crystal material 29 containing liquid crystal molecules 30 is filled in. Liquid crystal molecules 30 have negative dielectric anisotropy. On the outer sides of the glass substrate 1 and opposing substrate 36, polarizer plates 31 and 32 are disposed in a cross Nicol layout.

While voltage is not applied, liquid crystal molecules 30 are aligned at a right angle relative to the substrate surface. Liquid crystal molecules 30a on the slopes of the first and second projection patterns 16 and 18 tend to be aligned at a right angle relative to the slopes. Therefore, the liquid crystal molecules 30a on the slopes of the first and second projection patterns 16 and 18 are aligned obliquely relative to the substrate surface. However, since the liquid crystal molecules 30 are aligned vertically in a broad area of the pixel, a good black display state can be obtained.

FIG. 2B is a cross sectional view of the liquid crystal display when voltage is applied to make liquid crystal molecules 30 oblique, i.e., when the liquid crystal display device takes a half-tone display state. As shown in FIG. 2A, the liquid crystal molecules 30a inclined already are inclined further in the same inclination direction. Liquid crystal molecules 30 near the inclined molecules 30a are inclined in the same inclination direction under the influence of inclination of the inclined molecules 30a. Accordingly, the liquid crystal molecules 30 between the first and second projection patterns 16 and 18 are disposed in such a manner that their longitudinal axis (director) is directed along a straight line extending from the lower left to upper right as viewed in FIG. 2B. The liquid crystal molecules 30 left to the first projection pattern 16 and right to the second projection pattern 18 are disposed in such a manner that their longitudinal axis is directed along a straight line extending from the lower right to upper left as viewed in FIG. 2B.

A plurality of domains having liquid crystal molecules with the same inclination direction is therefore defined in one pixel. The first and second projection patterns 16 and 18 define the boundaries of the domains. By disposing the first and second projection patterns 16 and 18 in parallel in the substrate plane, two types of domains can be formed. In the example shown in FIG. 1, since the first and second projection patterns 16 and 18 are bent, domains of four types in total can be formed. Since a plurality of domains is formed in one pixel, view angle characteristics in the half-tone display state can be improved.

Figure 3:
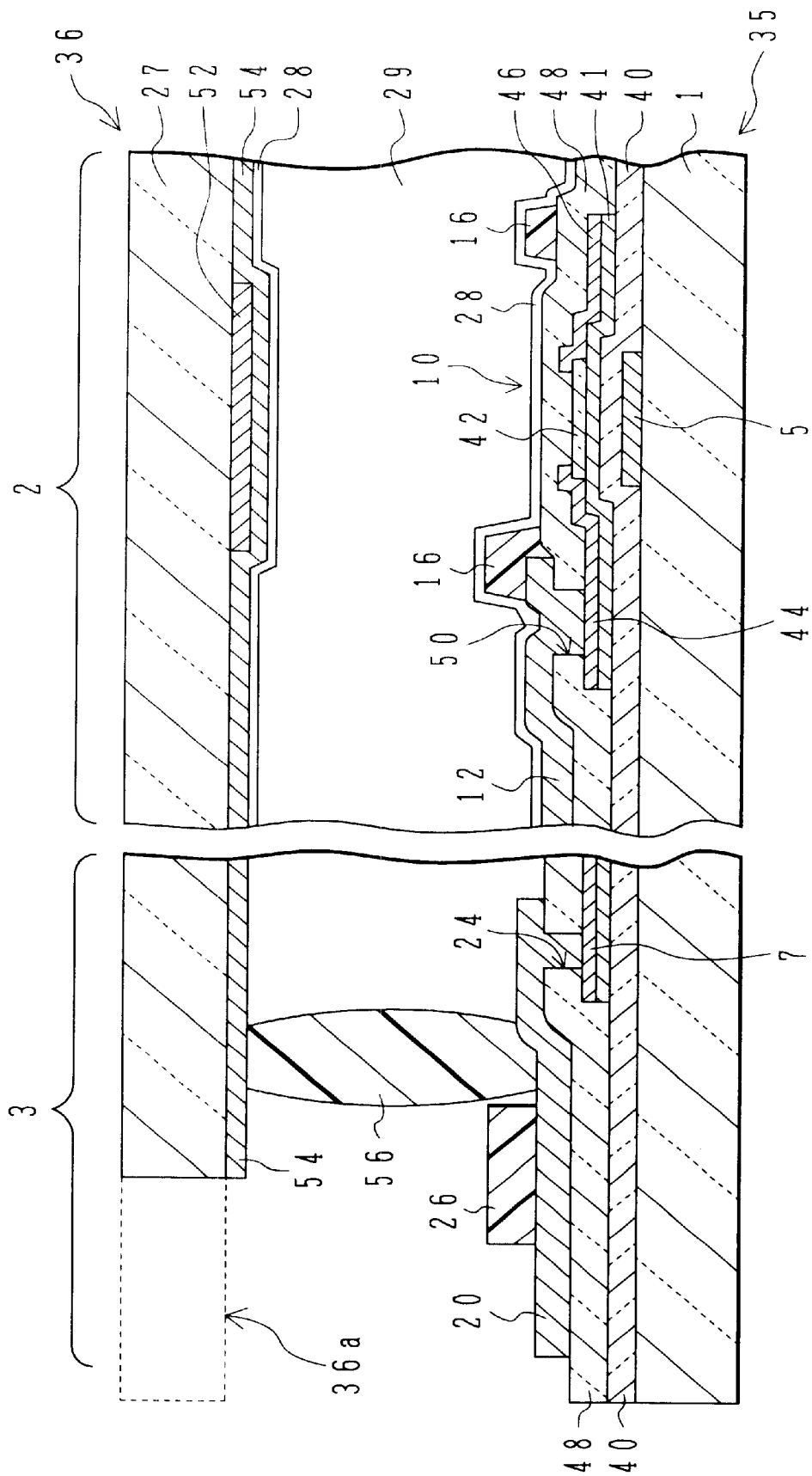
FIG. 3 is a cross sectional view of the liquid crystal display device of the first embodiment.

FIG. 3 is a cross sectional view of the liquid crystal display device shown in FIG. 1. Diagram portions right and left to the central broken area shown in FIG. 3 correspond to cross sectional views taken along on-dot chain lines A—A and B—B shown in FIG. 1, respectively. A TFT substrate 35 and an opposing substrate 36 are disposed in parallel spaced apart by a gap.

First, the structure of the TFT substrate 35 will be described. Gate bus lines 5 are formed on the opposing surface of a glass substrate 1. The gate bus line 5 has a two-layer structure of an Al film having a thickness of 10 nm and a Ti film having a thickness of 50 nm. A gate insulating film 40 is formed over the glass substrate 1, covering the gate bus lines 5. The gate insulating film 40 is a SiN film having a thickness of 400 nm.

An active region 41 is formed on the gate insulating film 40, overriding the gate bus line 5. The active region 41 is a non-doped amorphous Si film having a thickness of 30 nm. A channel protective film 42 is formed on the surface of the active region 41 in an area above the gate bus line 5. The channel protective film 42 is a SiN film having a thickness of 140 nm. The channel protective film 42 is patterned so as to cover the channel region of TFT 10 as viewed in FIG. 1.

A source electrode 44 and a drain electrode 46 are formed on the upper surface of the active region 41 at the region on both sides of the channel protective film 42. Each of the source and drain electrodes 44 and 46 has a lamination structure of an $n^+$-type amorphous Si film having a thickness of 30 nm, a Ti film having a thickness of 20 nm, an Al film having a thickness of 75 nm and a Ti film having a thickness of 80 nm stacked in this order. TFT 10 is constituted of the gate bus line 5, gate insulating film 40, active region 41, source electrode 44 and drain electrode 46.

In the terminal area 3, one end portion of a data bus line 7 is disposed on the gate insulating film 40. The data bus line 7 has the same lamination structure as that of the drain electrode 46 formed in the image display area 2. The amorphous Si film formed at the same time when the active region 41 was formed is left under the data bus line 7. An insulating film 48 is formed on the gate insulating film 40, covering TFT 10 and data bus line 7. The insulating film 48 is a film made of SiN, having a thickness of 330 nm.

A pixel electrode 12 is formed on the insulating film 48. The pixel electrode 12 is a film made of indium tin oxide (ITO), having a thickness of 70 nm, and is connected to the source electrode 44 via a contact hole 50 formed through the insulating film 48.

A first projection pattern 16 is formed on the pixel electrode 12 and insulating film 48. The first projection pattern 16 is made of photo resist. An alignment film 28 covers the uppermost layer in the image display area 2.

In the terminal area 3, a data terminal 20 is formed on the insulating film 48. The data terminal 20 is patterned when the pixel electrode 12 is patterned. The data terminal 20 is connected to the data bus line 7 via a contact hole 24 formed through the insulating film 48. A protective film 26 covers a partial upper surface of the data terminal 20. A partial region, near the border of the glass substrate 1, of the upper surface of the data terminal 20 is exposed.

Next, the structure of the opposing substrate 36 will be described. A light shielding film 52 made of Cr or the like is formed in a predetermined area of the opposing surface of a glass substrate 27. A common electrode 54 made of ITO is formed on the opposing surface of the glass substrate 27, covering the light shielding film 52. An alignment film 28 covers the surface of the common electrode 54 in the image display area 2. In the terminal area 3, the common electrode 54 is exposed.

The opposing substrate 36 is fixed at its peripheral position to the TFT substrate 35 with a sealing member 56, such as adhesive. The sealing member 56 hermetically seals the gap between the TFT substrate 35 and opposing substrate 36. Liquid crystal material 29 is filled in the gap between the TFT substrate 35 and opposing substrate 36. The liquid crystal material 29 has negative dielectric anisotropy. The sealing member 56 is fixed to the TFT substrate 35 in an inner area than the area where the protective film 26 is located. The sealing member 56 may be made in contact with the protective film 26.

Next, a method of adhering the TFT substrate 35 and opposing substrate 36 will be described. When the opposing substrate 36 is fixed to the TFT substrate 35, the border of the opposing substrate 36 is aligned approximately with the corresponding border of the TFT substrate 35, as viewed along a substrate normal direction. After the opposing substrate 36 is fixed to the TFT substrate 35, a peripheral region 36a of the opposing substrate 36 is cut off.

The border of the opposing substrate 36 after the peripheral region 36a is cut off passes the inside of the protective film 26. Therefore, it is possible to suppress the generation of damages or the like of the data terminal 20 on the TFT substrate 35 side while the opposing substrate 36 is scribed. It is therefore possible to suppress the generation of inferior conduction of the data terminal 20 and improve the manufacture yield. It is also possible to prevent short circuits between data terminals 20 to be caused by dusts generated by scribing the common electrode 54.

Next, with reference to FIGS. 4A to 4F, a method of manufacturing the TFT substrate 35 shown in FIG. 3 will be described.

Processes up to the state shown in FIG. 4A will be described. On the surface of the glass substrate 1, an Al film having a thickness of 100 nm and a Ti film having a thickness of 50 nm are sequentially formed. These films may be formed through sputtering. The two layers of the Al film and Ti film are patterned by photolithography techniques to leave a gate bus line 5. The Al film and Ti film are etched through reactive ion etching (RIE) using mixture gas of $BCL_3$ and $CL_2$.

Processes up to the state shown in FIG. 4B will be described. A gate insulating film 40 of SiN having a thickness of 400 nm is formed on the glass substrate 1, covering the gate bus line 5. A non-doped amorphous Si film 41a having a thickness of 30 nm is formed on the gate insulating film 40. For example, the gate insulating film 40 and amorphous Si film 41a are formed by plasma enhanced chemical vapor deposition (PE-CVD).

A SiN film having a thickness of 140 nm is formed on the amorphous Si film 41a by PE-CVD. This SiN film is patterned through photolithography techniques to leave a channel protective film 42. Using the gate bus line 5 as a photo mask, light is radiated from the bottom of the glass substrate 1 so that the edge of a resist pattern parallel to the row direction in FIG. 1 can be defined. The edge parallel to the column direction in FIG. 1 is defined through exposure using a usual photo mask. The SiN film may be etched by wet etching using buffered hydrofluoric acid or by RIE using fluorine gas.

Processes up to the state shown in FIG. 4C will be described. An $n^+$-type amorphous Si film having a thickness of 30 nm is formed over the whole substrate surface by PE-CVD, covering the channel protective film 42. On this $n^+$-type amorphous Si film, a Ti film having a thickness of 20 nm, an Al film having a thickness of 75 nm and a Ti film having a thickness of 80 nm are sequentially formed through sputtering. The layers from the uppermost Ti layer to the non-doped amorphous Si film 41a are etched and patterned by RIE using mixture gas of $BCl_3$ and $Cl_2$. In this case, in an area above the gate bus line 5, the channel protective film 42 functions as an etching stopper layer.

An active region 41 of non-doped amorphous Si is therefore left on the gate insulating film 40, overriding the gate bus line 5. A source electrode 44 and a drain electrode 46 are also left on the upper surface of the active region 41 at the region on both sides of the protective film 42. In the terminal area, a data bus line 7 is left.

Processes up to the state shown in FIG. 4D will be described. An insulating film 48 made of SiN having a thickness of 330 nm is formed over the whole substrate surface by PE-CVD. A contact hole 50 is formed through the insulating film 48 to expose a partial upper surface of the source electrode 44. At the same time, a contact hole 24 is formed to expose a partial upper surface of the data bus line 7 near the border thereof.

Processes up to the state shown in FIG. 4E will be described. An ITO film having a thickness of 70 nm is formed over the whole substrate surface. For example, the ITO film is formed by DC magnetron sputtering. This ITO film is patterned to leave a pixel electrode 12 and a data terminal 20. The ITO film is etched using the etchant including oxalic acid.

Processes up to the state shown in FIG. 4F will be described. A resist film is formed over the whole substrate surface and patterned to leave first projection patterns 16 in the image display area, and a protective film 26 in the terminal area. Next, an alignment film 28 is formed in the image display area.

During the processes shown in FIG. 4F of the first embodiment method, the protective film 26 is formed at the same time when the first projection pattern 16 is formed. It is therefore possible to form the protective film 26 without increasing the number of processes.

By using the protective film 26, identification symbols such as a product type, a product number and a lot number may be formed. For example, in an area other than the image display area, characters, bar codes, mosaic two-dimensional bar codes or the like may be formed.

Next, a method of manufacturing a liquid crystal display device according to the second embodiment will be described by paying attention to different points from the first embodiment manufacture method.

Figure 4A:
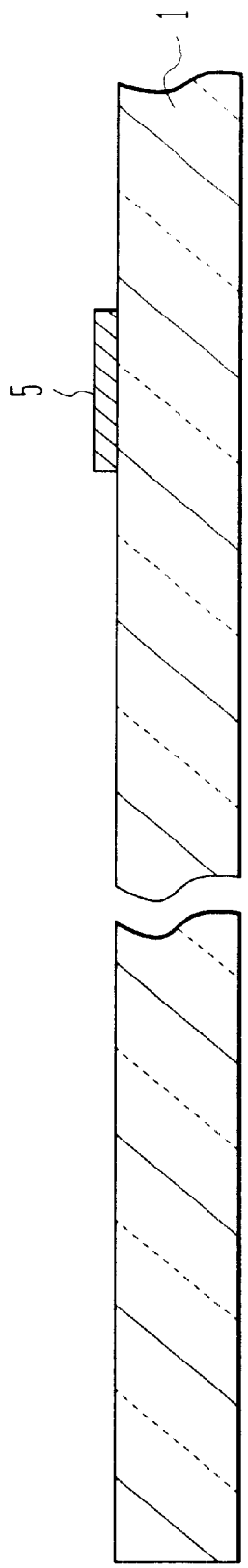
Figure 4B:
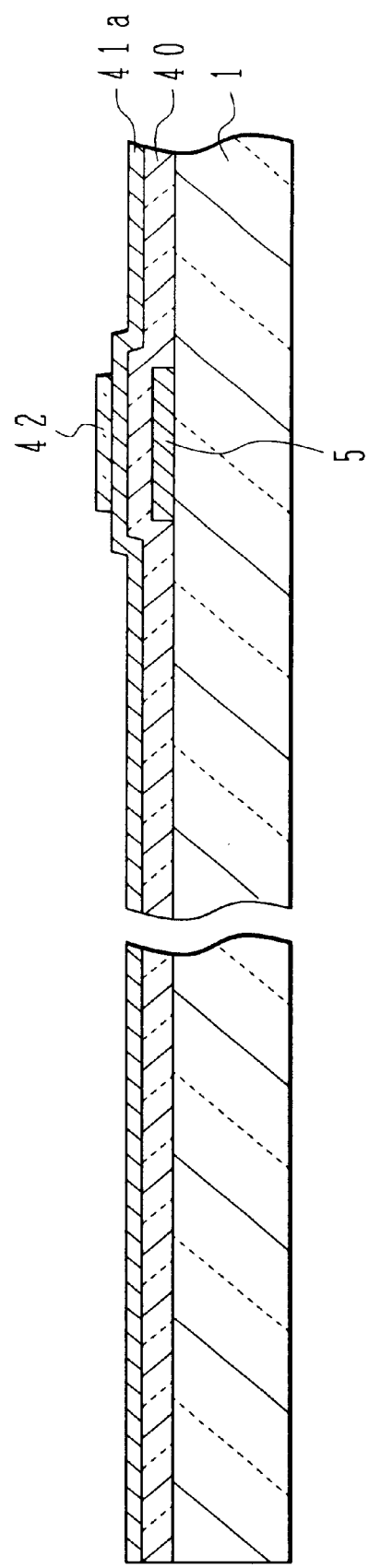

In the process shown in FIG. 4A, the gate bus line 5 is made of AlNd alloy which contains 2 mol % of Nd. As compared to the lamination structure of Al and Ti of the first embodiment, a wiring resistance can be reduced.

In the process shown in FIG. 4C, the source electrode 44, drain electrode 46 and data bus line 7 have the three-layer structure of an $n^+$-type amorphous silicon film having a thickness of 30 nm, a Ti film having a thickness of 20 nm and an Al film having a thickness of 300 nm. As compared to the four-layer structure of the first embodiment including the $n^+$-type amorphous silicon film, Ti film, Al film and Ti film, the Al film can be made thicker so that the wiring resistance of the data bus line 7 can be reduced. If a thick Al film is etched by RIE, burnt deposits of resist or the like may be generated. In such a case, it is preferable that the Al film is wet-etched.

In the second embodiment, since the uppermost layer of the source electrode 44 is the Al film, good electrical contact with the ITO film cannot be obtained. To prevent bad electrical contact between the source electrode 44 and the ITO film, the following processes are different from the first embodiment.

Figure 5A:
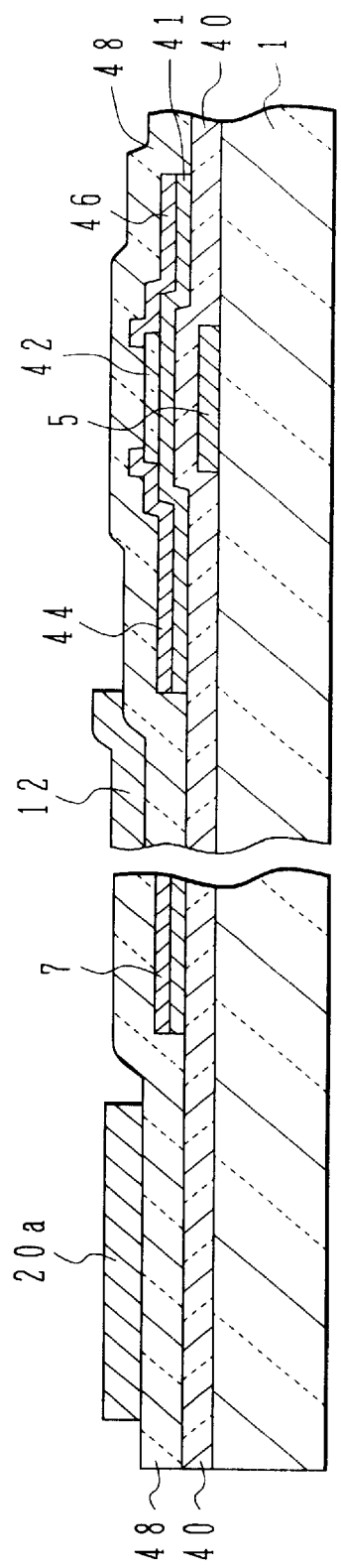
FIGS. 5A and 5B are cross sectional views of a substrate illustrating a method of manufacturing a TFT substrate of a liquid crystal display device according to a second embodiment.

As shown in FIG. 5A, an insulating film 48 made of SiN having a thickness of 330 nm is formed over the whole substrate surface. In this case, in order to form a tapered contact hole in a later process, it is preferable that the insulating film 48 is formed under the conditions that an etching rate in the upper layer is faster than that in the lower layer.

An ITO film is formed on the insulating film 48 and patterned to leave a pixel electrode 12 and an external connection portion 20a for the data terminal.

Figure 5B:
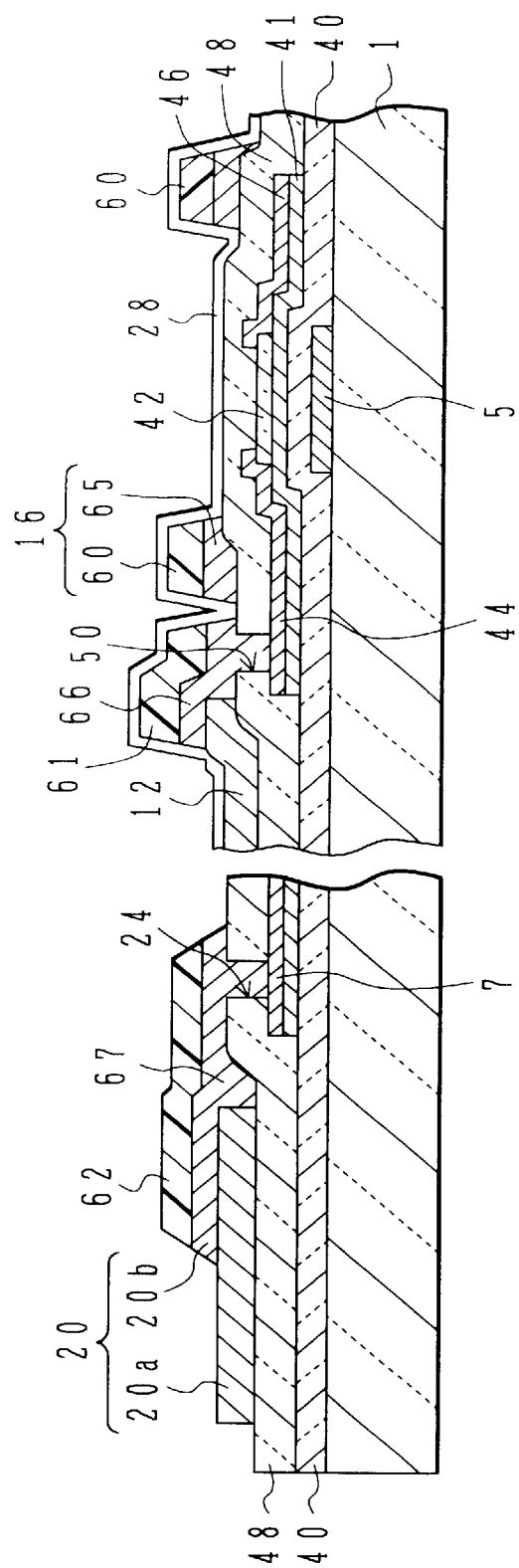
Figure 6:
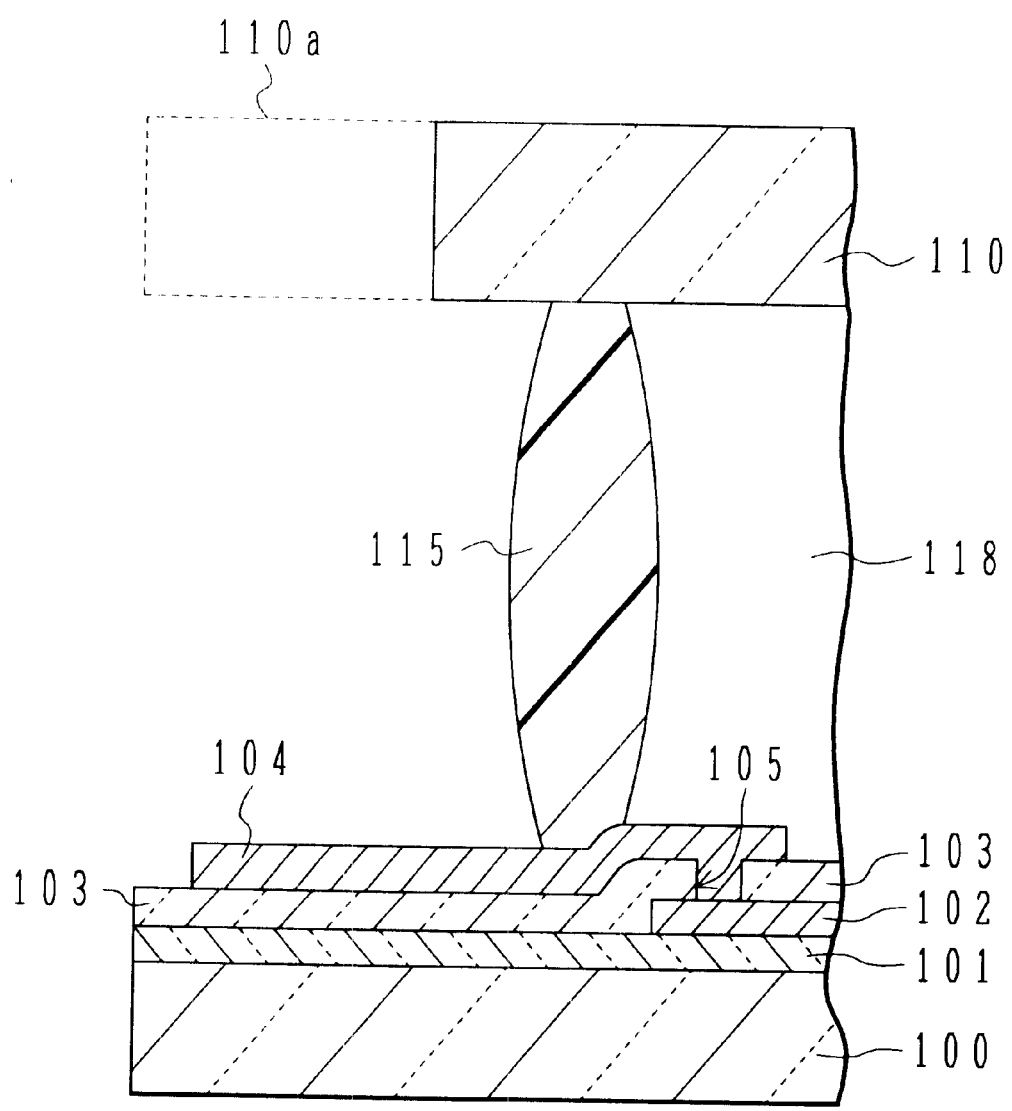
FIG. 6 is a cross sectional view of a conventional active matrix type liquid crystal display device showing a connection terminal to an external circuit.

As shown in FIG. 5B, contact holes 50 and 24 are formed through the insulating film 48, the contact hole 50 exposing a partial upper surface of the source electrode 44 and the contact hole 24 exposing a partial upper surface of the data bus line 7. A Ti film having a thickness of 20 nm is formed over the whole substrate surface, and on this Ti film, a photo resist film is formed and patterned to leave resist patterns 60, 61 and 62.

The resist pattern 60 has a pattern similar to the first projection pattern 16 shown in FIG. 1. In FIG. 1, one first projection pattern 16 traverses a plurality of pixel electrodes. However, in the second embodiment, in order not to make adjacent pixel electrodes be connected via the resist pattern 60, this resist pattern 60 is cut at the region between the adjacent two pixel electrodes 12.

The resist pattern 61 continuously covers from the area above the contact hole 50 to the end portion of the pixel electrode 12. The resist pattern 62 continuously covers from the area above the contact hole 24 to the partial area above the external connection portion 20a.

By using these resist patterns 60, 61 and 62 as a mask, the Ti film is etched. The resist pattern 60 and a Ti film 65 left under the resist pattern 60 constitute a first projection pattern 16. A Ti film 66 left under the resist pattern 61 makes the pixel electrode 12 electrically connect the source electrode 44. A Ti film 67 left under the resist pattern 62 makes the external connection portion 20a electrically connect the data bus line 7. An internal connection portion 20b made of the Ti film 67 and the external connection portion 20a constitute a data terminal 20. An alignment film 28 is formed covering the image display area.

The first projection pattern 16 of the second embodiment has the conductive Ti film 65 as the lower layer. However, in this case, since the first projection pattern 16 is cut at the region between adjacent pixel electrodes 12, there is no short circuit between adjacent pixel electrodes 12.

In the second embodiment, the pixel electrode 12 made of ITO is not in direct contact with the uppermost Al film of the source electrode 44, but is connected to the Al film via the Ti film 66. Good electrical connection between the pixel electrode 12 and source electrode 44 can therefore be obtained.

The resist pattern 62 covering the inner connection portion 20b of the data terminal 20 provides a similar function to that of the protective film 26 of the first embodiment shown in FIG. 3. While the peripheral portion of the opposing substrate is cut off, the data terminal 20 can be protected and the generation of inferior conduction of the data terminal 20 can be suppressed. Similar to the first embodiment, by using the resist pattern 62, identification symbols such as a product type, a product number and a lot number may be formed.

The present invention has been described in connection with the preferred embodiments. The invention is not limited only to the above embodiments. It is apparent that various modifications, improvements, combinations, and the like can be made by those skilled in the art.

What we claim are:

1. A substrate of a liquid crystal display device, comprising:
    a first substrate having an image display area defined on a principal surface of said first substrate and a terminal area defined on a partial area outside of the image display area;
    a plurality of first bus lines disposed on the image display area on the principal surface of said first substrate, an end portion of each of said first bus lines being formed in the terminal area;
    a first insulating film disposed over the principal surface of said first substrate, said first insulating film covering said first bus lines;
    a plurality of external terminals formed on the terminal area of said first substrate, each of said terminals being electrically connected to a corresponding end portion of each of said first bus lines via a corresponding one of first contact holes formed through said first insulating film and reaching an upper surface of said end portion of the first bus lines; and
    a protective film made of insulating material covering a partial area of an upper surface of said external terminals so as not to cover at least a partial area of the upper surface of said external terminals near a border of said first substrate.

2. A substrate of a liquid crystal display device according to claim 1, further comprising:
    a plurality of second bus lines formed on the image display area and crossing said first bus lines;
    a plurality of pixel electrodes formed on the image display area and disposed corresponding to cross points between said first and second bus lines; and
    a plurality of switching elements corresponding to said pixel electrodes, each of said switching elements connecting a corresponding first bus line and a corresponding second bus line, a conduction state of each of said switching elements being controlled by a signal applied to one of said corresponding first bus line and said corresponding second bus line.

3. A substrate of a liquid crystal display device according to claim 2, wherein:
    said switching elements are covered with said first insulating film, said pixel electrodes are disposed on said first insulating film, and each pixel electrode is connected to corresponding switching element via a second contact hole formed through said first insulating film; and
    said external terminals and said pixel electrodes are made of same material.

4. A substrate of a liquid crystal display device according to claim 3, further comprising a ridge-like projection patterns disposed over said pixel electrodes and made of a same material as said protective film.

5. A substrate of a liquid crystal display device according to claim 2, further comprising a ridge-like projection patterns disposed over said pixel electrodes and made of same material as said protective film.

6. A substrate of a liquid crystal display device according to claim 2, wherein:
    said switching elements are covered with said first insulating film;
    the substrate further comprises:
        a plurality of pixel connection lines, each electrically connecting each of said pixel electrodes to a corresponding switching element via a second contact hole formed through said first insulating film; and
        a cover film for covering an upper surface of said pixel connection lines;
    each of said terminals includes an external connection portion disposed on the terminal area and an internal connection portion being electrically connected to a corresponding external connection portion and to a corresponding end portion of each of said first bus lines; and
    said protective film covers an upper surface of said internal connection portion.

7. A substrate of a liquid crystal display device according to claim 6, wherein said pixel connection lines and said internal connection portions are made of same material, said pixel electrodes and the external connection portions are made of same material, and said protective film and said cover film are made of same material.

8. A substrate of a liquid crystal display device according to claim 7, further comprising a ridge-like projection patterns disposed on each of said pixel electrodes, said ridge-like projection patterns having a lamination structure of a lower layer made of same material as said pixel connection lines and an upper layer made of a same material as said cover film wherein said ridge-like projection patterns are cut at a region between adjacent pixel electrodes.

9. A substrate of a liquid crystal display device according to claim 6, further comprising a plurality of ridge-like projection patterns disposed on each of said pixel electrodes, said ridge-like projection patterns having a lamination structure of a lower layer made of a same material of each of said pixel connection lines and an upper layer made of same material as said cover film, wherein said ridge-like projection patterns are cut at a region between adjacent pixel electrodes.

10. A liquid crystal display device comprising:
    a first substrate having an image display area defined on a principal surface of said first substrate and a terminal area defined in a partial area outside of the image display area;
    a plurality of first bus lines disposed on the image display area on the principal surface of said first substrate, an end portion of each of said first bus lines being formed in the terminal area;
    a first insulating film disposed over the principal surface of said first substrate, said first insulating film covering said first bus lines;
    a plurality of external terminals formed on the terminal area of said first substrate, each of the external terminals being electrically connected to a corresponding end portion of each of said first bus lines via a corresponding one of first contact holes formed through said first insulating film and reaching an upper surface of said end portion of each of the first bus lines;

a protective film made of insulating material covering a partial area of upper surfaces of said external terminals so as not to cover at least partial areas of the upper surfaces of said external terminals near a border of said first substrate;

a second substrate facing the principal surface of said first substrate and spaced apart by a gap from the principal surface, said second substrate having a common electrode formed on a surface facing said first substrate and being disposed so that a partial border of said second substrate passes an inner area of said protective film as viewed along a direction normal to said second substrate; and a sealing member for fixing said second substrate to said first substrate in a peripheral area of said second substrate and hermetically sealing the gap between said first and second substrates, and liquid crystal material filled in the gap between said first and second substrates;

wherein said sealing member is fixed to said first substrate further from the border than the area where the protective film is located or at least partially in contact with the protective film.

11. A method of manufacturing a liquid crystal display device comprising the steps of:

preparing a first substrate having an image display area defined on a principal surface of said first substrate and a terminal area defined in a partial area outside of the image display area, the first substrate being formed with: a plurality of first bus lines disposed on the image display area on the principal surface of the first substrate; a first insulating film disposed over the principal surface of the first substrate, the first insulating film covering said first bus lines; a plurality of external terminals formed on the terminal area of the first substrate, each of said external terminals being electrically connected to a corresponding end portion of each of the first bus lines via a corresponding one of first contact holes formed through the first insulating film and reaching an upper surface of the end portion of the first bus lines; a protective film made of insulating material covering a partial area of an upper surface of the external terminals so as not to cover at least a partial area of the upper surface of the external terminals near a border of the first substrate; a plurality of second bus lines formed on the image display area and crossing the first bus lines; a plurality of pixel electrodes formed on the image display area and disposed corresponding to cross points between the first and second bus lines; and a plurality of switching elements corresponding to the pixel electrodes, each of switching elements connecting a corresponding first bus line and a corresponding second bus line, a conduction state of each of the switching elements being controlled by a signal applied to one of the corresponding first bus line and the corresponding second bus lines;

preparing a second substrate formed with a common electrode on a surface thereof;

disposing the first and second substrates so that the surface of the second substrate with the common electrode is spaced apart by a gap from the principal surface of the first substrate, and fixing the first and second substrates with a sealing in such a manner that the sealing member does not cover at least a partial area of an upper surface of the protective film near the border of the first substrate; and cutting off a portion of the second substrate near a border of the second substrate so that a new border of the cut second substrate passes an inner area of the protective film as viewed along a direction normal to said first substrate.

* * * * *

UNITED STATES PATENT AND TRADEMARK OFFICE
CERTIFICATE OF CORRECTION

PATENT NO.   : 6,480,255 B2
DATED        : November 12, 2002
INVENTOR(S)  : Hoshino et al.

It is certified that error appears in the above-identified patent and that said Letters Patent is hereby corrected as shown below:

Column 9,
Line 39, after "said end portion" insert -- of each --.
Line 55, after "switching elements connecting" insert -- each of said pixel electrodes to --.

Column 10,
Line 23, after "of said" insert -- external --.
Line 38, after "comprising a" insert -- plurality of --.

Column 12,
Line 6, after "said end portion" insert -- each of --.
Line 17, after "switching elements connecting" insert -- each of the pixel electrodes to --.
Line 30, after "sealing" insert -- member --.

Signed and Sealed this

Third Day of June, 2003

JAMES E. ROGAN
*Director of the United States Patent and Trademark Office*